US012638603B2

(12) United States Patent     (10) Patent No.:   US 12,638,603 B2

Dabiran            (45) Date of Patent:     May 26, 2026

(54) NANOSTRUCTURED HIGH-ENERGY PARTICLE IMAGING SENSOR AND A NANOINJECTION MOLDING PROCESS FOR MAKING THE SAME AND OTHER NANOSTRUCTURES

(71) Applicant: Amir Massoud Dabiran, Chanhassen, MN (US)

(72) Inventor: Amir Massoud Dabiran, Chanhassen, MN (US)

(73) Assignee: Amir Massoud Dabiran, Chanhassen, MN (US)

( * ) Notice: Subject to any disclaimer, the term of this patent is extended or adjusted under 35 U.S.C. 154(b) by 105 days.

(21) Appl. No.: 18/225,881

(22) Filed: Jul. 25, 2023

(65) Prior Publication Data

US 2023/0367024 A1     Nov. 16, 2023

Related U.S. Application Data

(63) Continuation-in-part of application No. 17/475,565, filed on Sep. 15, 2021, now Pat. No. 11,747,493.

(60) Provisional application No. 63/079,336, filed on Sep. 16, 2020.

(51) Int. Cl.
    *G01T 1/20*        (2006.01)
(52) U.S. Cl.
    CPC ................................. *G01T 1/20182* (2020.05)
(58) Field of Classification Search
    CPC .......................... G01T 1/20182; G01T 1/2018
    See application file for complete search history.

(56) References Cited

U.S. PATENT DOCUMENTS

| | | | |
|---|---|---|---|
| 4,002,938 A | 1/1977 | Pehe | |
| 4,069,421 A | 1/1978 | Bourdel | |
| 4,208,577 A | 6/1980 | Wang | |
| 4,287,230 A | 9/1981 | Galves et al. | |

(Continued)

FOREIGN PATENT DOCUMENTS

| | | |
|---|---|---|
| CN | 110416056 A | 11/2019 |
| KR | 20170067452 A | 6/2017 |

OTHER PUBLICATIONS

"International Preliminary Report on Patentability Received mailed on Mar. 30, 2023", 8 Pages.

(Continued)

*Primary Examiner* — Jacob T Minskey
*Assistant Examiner* — Adrien J Bernard
(74) *Attorney, Agent, or Firm* — Billion & Armitage

(57)           ABSTRACT

Disclosed is an imaging apparatus comprising: a segmented scintillator structure; and a photocathode structure optically coupled to the segmented scintillator structure, for conversion of high-energy particles with an arbitrary spatial distribution to a corresponding distribution of photoelectrons, emitted with a spread in energy ranging from 100 meV to 1 meV. Also disclosed is an imaging apparatus comprising: a segmented scintillator structure, and a photocathode structure optically coupled to the segmented scintillator structure, for conversion of high-energy particles with an arbitrary spatial distribution to a corresponding distribution of photoelectrons, emitted with an angular spread ranging from 10 degrees to 0.1 degrees. Also disclosed is a pressureless filling of capillary tubes and nano-molds using electroosmosis effect.

20 Claims, 3 Drawing Sheets

(56) References Cited

U.S. PATENT DOCUMENTS

| | | | |
|---|---|---|---|
| 4,398,118 | A | 8/1983 | Galves et al. |
| 4,498,225 | A | 2/1985 | Gutierrez et al. |
| 4,730,107 | A | 3/1988 | Enck et al. |
| 4,778,565 | A | 10/1988 | Enck et al. |
| 4,855,589 | A | 8/1989 | Enck et al. |
| 4,893,020 | A | 1/1990 | Ono |
| 4,929,835 | A | 5/1990 | Yamashita et al. |
| 4,935,617 | A | 6/1990 | Anno et al. |
| 4,982,136 | A | 1/1991 | Dolizy et al. |
| 5,179,284 | A | 1/1993 | Kingsley et al. |
| 5,319,189 | A | 6/1994 | Beauvais et al. |
| 5,515,411 | A | 5/1996 | Tonami et al. |
| 5,587,621 | A | 12/1996 | Colditz |
| 6,752,966 | B1 * | 6/2004 | Chazan ............ B01L 3/502707 |
| | | | 422/503 |
| 7,039,157 | B2 | 5/2006 | Fujii et al. |
| 7,455,565 | B2 | 11/2008 | Machuca et al. |
| 9,316,742 | B2 | 4/2016 | Chen |
| 2004/0232343 | A1 | 11/2004 | Schmand et al. |
| 2005/0255315 | A1 * | 11/2005 | Yamanaka ............. C25D 11/24 |
| | | | 428/357 |
| 2007/0072032 | A1 * | 3/2007 | Kouassi ................... C25F 3/14 |
| | | | 429/434 |
| 2008/0272280 | A1 | 11/2008 | Pinkas et al. |
| 2014/0231254 | A1 * | 8/2014 | Tung ...................... B81C 3/001 |
| | | | 204/452 |

OTHER PUBLICATIONS

"International Search Report and Written Opinion Received mailed Dec. 20, 2021", 15 pages.

Chen, C., et al., "Fabrication of Nanoscale Cesium Iodide (Csl) Scintillators for High-Energy Radiation Detection", Rev. Nanosci. Nanotechnol. 4 (2015) 26.

Chen, Gongxiaohui , et al., "Mean Transverse 12,13 Energy of Ultrananocrystalline Diamond Photocathode", Dec. 2, 2018.

Watts, R.N., et al., "A transmission x-ray microscope based on secondary-electron imaging", Rev. Sci. Instrum. 68 (1997) 3464.

* cited by examiner

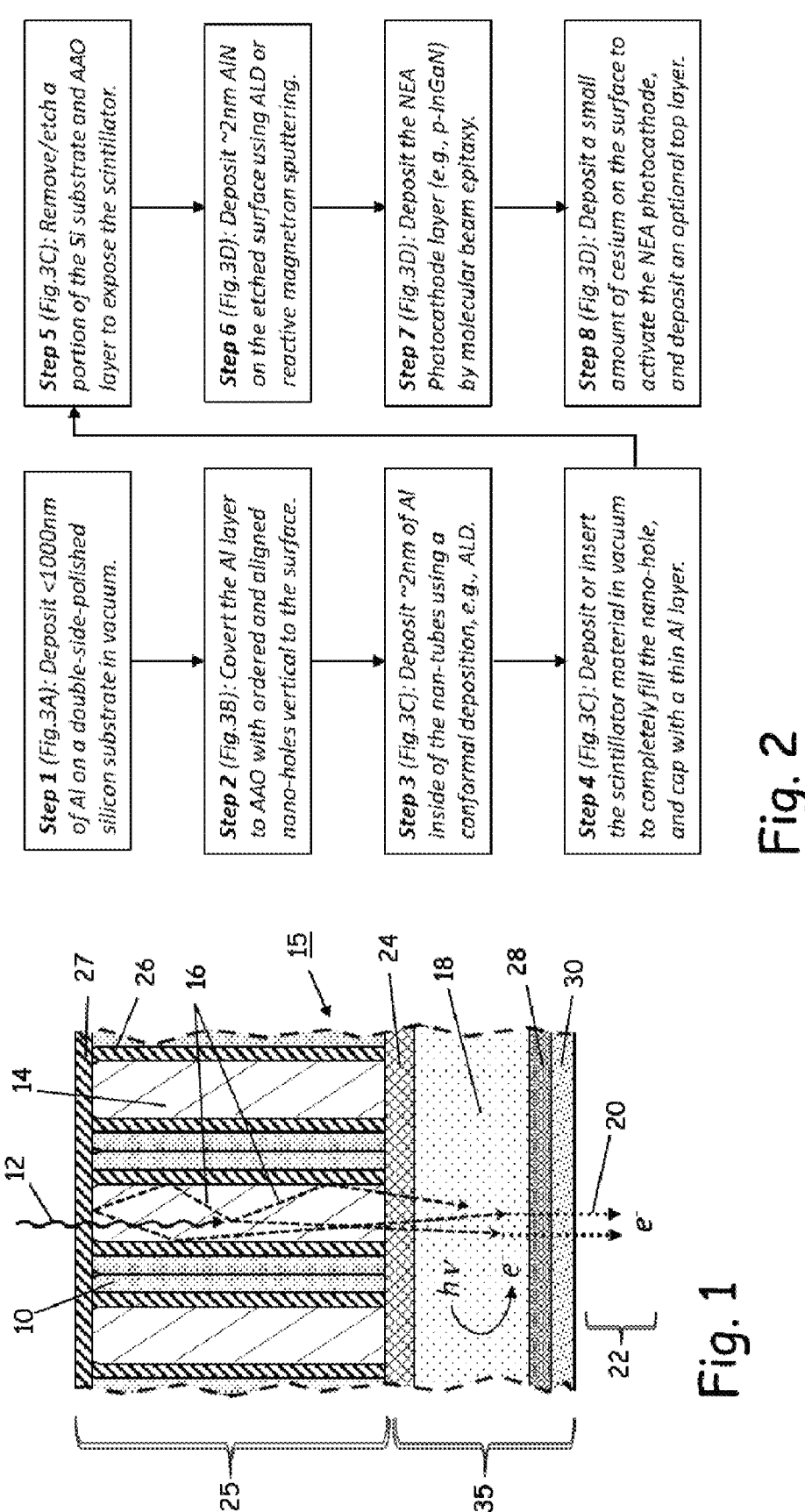

Step 1 (Fig.3A): Deposit <1000nm of Al on a double-side-polished silicon substrate in vacuum.

Step 2 (Fig.3B): Covert the Al layer to AAO with ordered and aligned nano-holes vertical to the surface.

Step 3 (Fig.3C): Deposit ~2nm of Al inside of the nan-tubes using a conformal deposition, e.g., ALD.

Step 4 (Fig.3C): Deposit or insert the scintillator material in vacuum to completely fill the nano-hole, and cap with a thin Al layer.

Step 5 (Fig.3C): Remove/etch a portion of the Si substrate and AAO layer to expose the scintillator.

Step 6 (Fig.3D): Deposit ~2nm AlN on the etched surface using ALD or reactive magnetron sputtering.

Step 7 (Fig.3D): Deposit the NEA Photocathode layer (e.g., p-InGaN) by molecular beam epitaxy.

Step 8 (Fig.3D): Deposit a small amount of cesium on the surface to activate the NEA photocathode, and deposit an optional top layer.

NANOSTRUCTURED HIGH-ENERGY PARTICLE IMAGING SENSOR AND A NANOINJECTION MOLDING PROCESS FOR MAKING THE SAME AND OTHER NANOSTRUCTURES

TECHNICAL FIELD

The present invention is in the technical field of high-energy photon and particle detection and imaging. More particularly, the present invention is in the technical field of high-energy photon and particle detection and imaging equipment. More specifically, the current invention can be used in combination with an electron multiplier and/or electron optics to set up a high-resolution imager or high-power microscope, such as a gamma-ray camera or an x-ray microscope.

More particularly, the present invention is in the technical field of micro and nano scale materials fabrication. More particularly, the present invention is in the technical field of pressureless injection of fluid materials and composites, including but not limited to viscus materials, into ordered and/or random nano-structured molds in order to fabricate nanostructured materials.

BACKGROUND

Conversion of photons to photoelectrons using a photocathode has a number of advantages compared to direct imaging of photons, including convenient signal amplification using an electron multiplier, potential for using electron optics for high-resolution image magnification, and relatively simple conversion back to visible photons for observation and/or recording of the image using different electron detection techniques.

The traditional use of sensitive photographic films for imaging high-energy photons, such as x-ray or extreme ultra-violet (EUV), has been mostly replaced by digital and real-time imaging techniques using a scintillator layer to convert the high-energy photons or particles to lower-energy photons, e.g., visible photons, which can be subsequently recorded using an ordinary camera. The major problem with this method is relatively limited resolving power and magnification capabilities, which becomes very important for some applications, such as high-resolution x-ray microscopy. This problem mainly arises from 1) limitations in the availability of high-performance optics for high-energy photons, e.g., hard x-ray, and 2) a significant image blurring mostly caused by random direction of lower-energy (e.g., visible) photons generated in the thick scintillator layer. The latter problem may be greatly reduced by using thinner scintillator layers but that would also reduce the efficiency of the photon conversion process. Additionally, the attainable depth of field in light optics is quite short for high resolving-power (large numerical aperture) systems, typically in the range of 1 micrometer to 15 micrometers, further reducing the scintillator thickness and trading off signal generation. Whereas this problem is removed for electromagnetic lensing where depths of field are typically 1 millimeter to 10's of millimeters.

SUMMARY OF THE INVENTION

The present invention, a multi-purpose device, for example but not limited to, an integrated photocathode and scintillator for high-resolution imaging with high-energy particles, and method of making the same, herein also referred to as "the invention", addresses the problem with both the limitations of practiced methods for high image magnification using high-energy photons, and the blurring effect of thick scintillator layers used in high-energy photon and particle imaging. This is accomplished by integrating suitable photocathode and scintillator layers with optimized properties and structure for high-efficiency conversion of high-energy photons to photoelectrons with very low spread in energy and momentum in order to allow high-sensitivity photon detection and high-resolution image magnification. The purpose of the first layer is to have high stopping power for high-energy particles, and the purpose of the second layer is to transfer the absorbed energy into low-energy photoelectrons for subsequent emission and electron-optical guiding.

A number of photocathode materials, in particular thin metal-halide films, such as cesium-iodide (CsI) or cesium-bromide (CsBr), and others, have been previously shown to be suitable for operation in EUV and soft x-ray (1 to 10 keV) range, and they have been used for imaging applications such as transmission soft x-ray microscopy, where a transmission-mode (also called semitransparent) photocathode is coupled to an electron microscope column for image magnification. However, the photoemission efficiencies of these thin photocathodes are greatly diminished at very high photon energies, such as hard x-ray (10 to 100 keV), due to lower photon absorption. Thicker photocathode films can be used to increase the photon absorption, but a low escape depth in the utilized positive electron affinity (PEA) photocathodes greatly reduces the contribution from photoelectrons generated farther away from the surface, while also more inelastic scattering in thicker photocathode films greatly diminishes the phase coherence of photoelectrons, resulting in further image blurring and reduction in the resolving power of the microscope. Furthermore, as the photon energy is increased, higher energy photoelectrons, i.e., hot electrons, with larger energy and momentum spread are emitted, requiring precise energy filtering in the electron optics column before image magnification, which can severely reduce the beam intensity.

As noted above, various scintillators have been used in x-ray imaging. Separately, direct conversion of soft x-rays to photoelectrons in some photocathodes has been studied for x-ray microscopy, with both techniques having significant problems for high-resolution imaging and microscopy, especially at higher photon energies. The present invention achieves the beneficial aspects of both techniques by integrating high-efficiency thin photocathodes with optimally structured scintillators to provide high photoemission efficiency values of ~1% to near 100%, depending on the excitation wavelength, while delivering coherent photoelectrons with a narrow energy spread of <100 meV down to ~26 meV. The lower bond is determined by the thermal energy which is close to 26 meV at room temperature, and hence significantly lower values require operation in cryogenic temperatures. A narrow energy spread is needed to avoid any significant blurring in the subsequent electromagnetic lensing system or electron-optical column, which is required for high image magnification using high-energy photons or particles. In addition to high-resolution x-ray microscopy, the present invention can greatly impact the performance of EUV and x-ray telescopes, parallel beam electron lithography, and other imaging and electron source applications.

BRIEF DESCRIPTION OF THE DRAWINGS

The present invention may be embodied in a number of relevant components, structures and/or process steps, as well as their arrangement and/or quantities. The drawings are only for the purposes of illustrating a preferred embodiment and are not to be construed as limiting the invention.

FIG. 2 is a flow diagram of the main steps in the inventive method for fabricating a preferred embodiment of the present invention.

DISCLOSURE OF THE INVENTION

Figures 1, 3A, 3B, 3C, 3D:
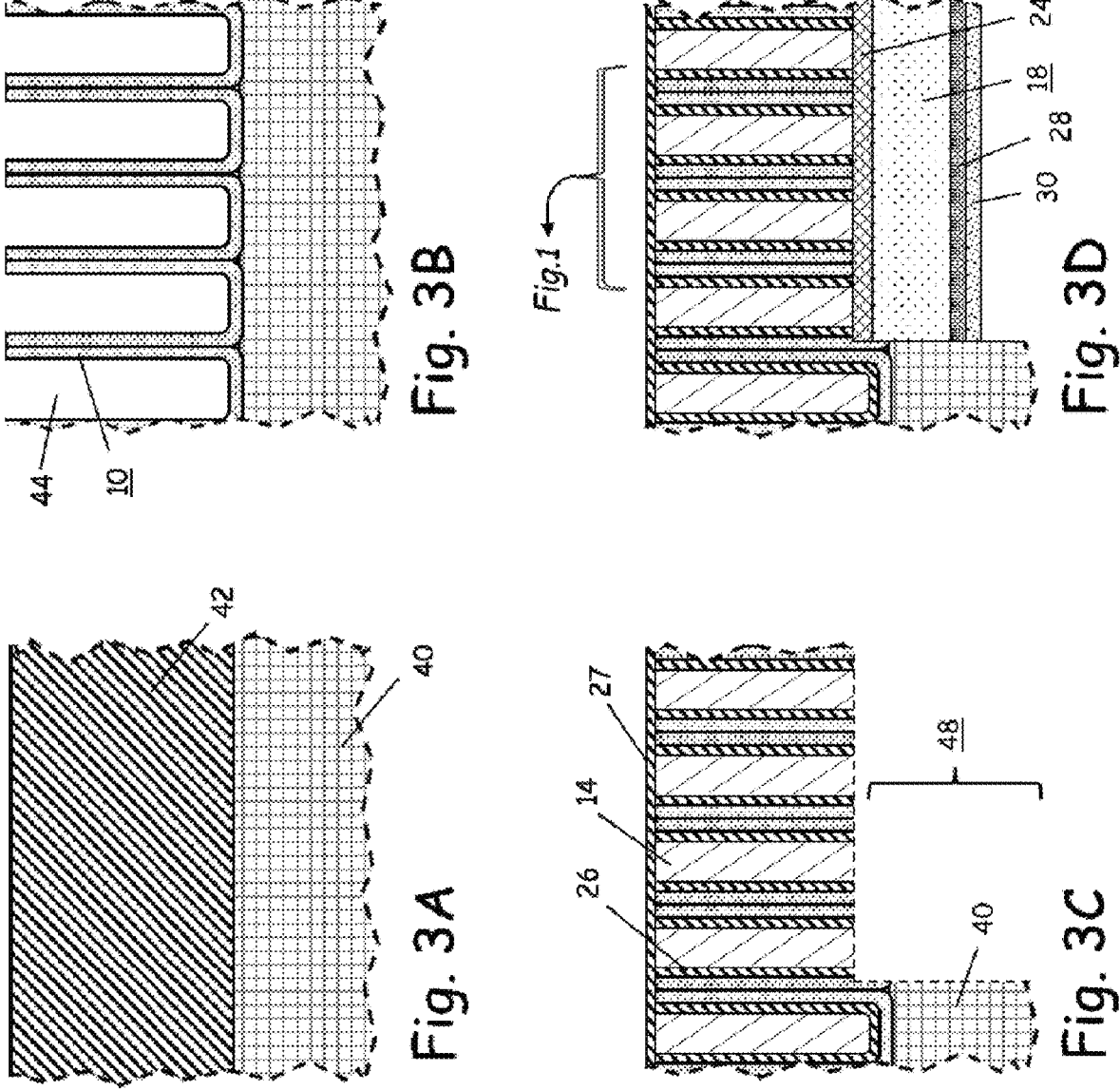
FIG. 1 shows the basic structure and operation of the present invention including a photocathode layer integrated with a wavelength-matched scintillator structure for efficient conversion of high-energy photons and particles to photoelectrons, which are emitted into vacuum with a narrow energy and momentum spread for achieving very high-resolution imaging in conjunction with an intensifier and/or electron optics.
FIGS. 3A, 3B, 3C, and 3D illustrate sequential steps in a preferred process for fabrication of a preferred embodiment of the invention, while a number of useful variations of each basic process step, not shown in these figures, are discussed in the detailed description of the invention.

To describe the present invention in more details, a cross sectional view of an embodiment of the apparatus 15, comprised of an integrated scintillator structure 25 and a photocathode structure 35, is schematically shown in FIG. 1. In this embodiment a thin transmission-mode (also called semi-transparent) negative electron affinity (NEA) photocathode 18, which can be comprised of single-crystalline, poly-crystalline and/or amorphous forms of materials such as GaAs, GaAsP, GaN, or alloys of these materials with other elements, for example InAlGaN, with mole fraction of different constituents ranging from 0% to 100%, and/or with different levels of doping materials, and/or combinations of these materials with different arrangements and/or materials composition and/or composition gradients, etc., in order to adjust different properties of the photocathode layer 18, such as energy bandgap, optical absorption, electrical conductivity, photoelectron emission, defect levels, surface morphology, etc., as well as another types of photocathode materials and structures, is integrated with a thin (e.g., less than 10 μm) and optimally structured scintillator layer 25 with a properly matching luminescence spectrum. Some examples of the scintillator materials include cesium-iodide (CsI), thallium-doped sodium-iodide (NaI:Tl), cerium-activated yttrium aluminum garnet (YAG:Ce), cerium-tribromide (CeBr$_3$), as well as other types, combinations, or arrangements of inorganic and/or organic scintillators.

In an embodiment of the present invention the photocathode structure 35 and scintillator structure 25 may be integrated by direct deposition of the photocathode layer 18 on the scintillator structure 35, or vice versa, with or without an intermediate layer 24, using any appropriate thin-film deposition or growth process, such as liquid phase epitaxy, vapor phase epitaxy, physical vapor deposition, chemical vapor deposition, atomic layer deposition, spray or spin coating, or others.

In another embodiment of the present invention the photocathode structure 35 and scintillator structure 25 may be integrated by physical attachment, including simple stacking or positioning of the photocathode structure 35 and scintillator structure 25 with or without an intermediate layer 24.

In another embodiment of the present invention the photocathode structure 35 and scintillator structure 25 may be integrated by chemical bonding, using an appropriate adhesive and/or by thermal and/or pressure bonding, or other wafer bonding methods in vacuum or under an appropriate atmosphere or in another medium, with or without an intermediate layer 24.

In a further embodiment of the present invention the scintillator material 14 may consist of single-crystalline, polycrystalline, and/or amorphous, micro-structure and/or nano-structured layers, further consisting of one or more material compositions or composition gradients, and/or different doping or activation materials or impurities, with different doping level profiles. Furthermore, the structure and segmentation of the scintillator material 14 may be naturally formed in the deposition, annealing, or bonding process, or intentionally formed and/or patterned for the purpose of improving the luminescence spectrum, photon yield, and/or other characteristics, and/or for improving the integration of the photocathode structure 35, and/or reducing the image blurring and/or increasing the efficiency by confining and/or guiding the generated photons using internal reflection and/or a surface reflection layer, and/or forming a waveguide. Furthermore, other techniques and effects, such as stimulated luminescence, photonic band-gap materials and structures, plasmonic structures and effects, and/or other techniques may be used to enhance confinement, directionality and/or coherence of photons in order to increase photon density in the scintillator 14, improve photon extraction, and/or reduce the image blurring.

In a further embodiment of the present invention, the photocathode structure 35 may include single-crystalline, and poly-crystalline, and/or micro-structure and/or nano-structured layers, and/or hetero-structures, comprising one or more material compositions or composition gradients, including different combinations of various NEA and PEA photoemissive materials and structures, and/or different doping or activation materials or impurities with different doping level profiles, and/or a deposited or formed NEA activation layer 28, or layers, and/or a protective top layer 30, or layers, such as an electron-transparent graphene film or a grid structure, for the purpose of increasing photoemission efficiency, and/or reducing the momentum spread of the emitted electrons, and/or modifying the surface conductivity, and/or improving the photoemission stability, and/or increasing lifetime, and/or enhancing robustness of the device, and/or reducing the production costs, and/or other beneficial characteristics.

The device operation is initiated by energetic radiation 12 (e.g., an x-ray photon or a beta particle) entering into the scintillating material 14 to generate a number of lower energy photons 16 (e.g., visible photons) which then cross into the photocathode layer 18 to produce photoelectrons 20, which diffuse and/or drift to the surface, and under proper NEA conditions at the surface are ejected into vacuum 22. The emitted photoelectrons 20 can be then detected, or their number can be first increased using an electron multiplication method (e.g., a microchannel pate) for signal amplification, and/or further manipulated using electron optics for image magnification, electron beam lithography, or other applications.

The lower bound for the energy spread of emitted photoelectrons is normally near the thermal energy, kT, where k is the Boltzmann constant and T is absolute temperature in Kelvins. The value of kT which is about 26 meV at room temperature, significantly drops at lower temperatures (e.g., kT is about 7 meV at liquid nitrogen temperature of about 77 K or −196° C.). In one embodiment, the energy spread of emitted photoelectrons will be in the range of 500 meV to 1 meV. In still another embodiment, the energy spread of emitted photoelectrons will be in the range of 50 meV to 1 meV.

A range for angular spread of emitted photoelectrons, in one embodiment, is 20 degrees to 0.1 degree and in another embodiment is 10 degrees to 0.1 degree, and in yet another embodiment is 1 degree to 0.1 degree.

A further invention can be used in combination with appropriately selected materials to produce nanostructured materials with new or modified properties. As a specific example, the method for the fabrication of a nanostructured x-ray scintillator, for high resolution x-ray imaging, by pressureless nanoinjection molding (NIM) using an ordered glass capillary array (GCA) or an isotropic anodic aluminum-oxide (AAO) array is described.

The properties of materials at small dimensions can be significantly different compared to their bulk properties. Size-dependent effects provide a great tool for tuning different properties including mechanical, chemical, electrical, optical, magnetic, thermal, spectroscopic, and other characteristics of nanostructured materials. Advances in nanofabrication technologies have resulted in development of engineered nanomaterials with modified properties for new products with substantially higher performances. Nanomaterials have found numerous commercial applications, from scratch-resistance paints, durable surface coatings, cosmetics, and purification filters, to high-performance electronic and optoelectronic devices, ultrahigh-sensitivity chemical sensors, high-efficiency energy production and storage devices, advanced biochemical and pharmaceutical manufacturing, and many others.

The nanofabrication methods can be roughly divided into so called "top-down" and "bottom-up". The top-down notion is used to indicate that the dimensions of the starting/source materials, e.g., in bulk form, is much larger than the nanostructure features. Conversely, the bottom-up method refers to forming the desired nanostructure features from even smaller components, such as molecular clusters, individual molecules, and/or atoms. Examples of bottom-up nanofabrication methods include different physical or chemical vapor or molecular deposition, precipitation, solvent evaporation, sol-gel condensation, and other ways of forming nano-structures by aggregating or condensing smaller size particles. For instance, in chemical vapor deposition (CVD), using appropriate precursor materials and substrates, the deposition parameters such as substrate temperature and process gas pressures can be adjusted to achieve nano-columnar growth.

Examples of top-down nanofabrication methods include lithography-assisted chemical etching or sputtering, ion milling, and nano imprinting and molding. The top-down formation of a nanostructure can start with a bulk solid or liquid material which is sectioned into the desired nano-structures using either a nano-sculpting process, such as ion-milling or reactive ion etching (RIE), or by deforming source material into much smaller units using a nano-stamp or nano-mold, which is usually made of mechanically harder materials.

Usually nano-stamping or nano-imprinting refers to forcing a patterned surface into a softer material to form an impression with the desired nano-pattern, whereas nano-molding refers to forcing or injecting a material into open cavities of a harder material to form a desired nanostructure. Also, nano-imprinting is usually done with nanofeatures that have vertical or converging sidewalls, which are also not very long or very deep, i.e., features with low aspect ratios to allow nondestructive removal of the nano-stamp from the material after nano-imprinting. On the other hand, nano-molding can be used to achieve geometrically more complex three-dimensional (3D) nanostructures, or even used for filling random porous materials. In this case, the mold can be either left after the filling process, if it does not adversely affect the material properties, or have to be etched away without significantly degrading the important properties. Lastly, considering the physical equivalence of forcing a material into a patterned template with pushing the template onto a material, nano-imprinting techniques can be considered a subset of 3D nano-molding, and henceforth will be collectively referred to as nanoinjection molding (NIM).

Among different nanofabrication methods mentioned above, NIM is the most convenient and versatile for a number of reasons: (1) NIM is mostly based on mechanical properties of materials, instead of more complicated chemical properties which can greatly affect materials deposition or etching processes. (2) NIM process usually involves fewer and/or less complicated steps, and hence it is easier to scale up for low-cost production, including rolled-panel and roll-to-roll processing. (3) NIM can be used to fabricate nanostructures with arbitrary patterns and combinations of differently sized and shaped features, whereas using materials deposition or condensation techniques these variations are either not possible, or the nanofeature size, shape, distribution and/or uniformity are much less controllable. (4) Lastly, NIM can be applied to a wide range of materials, including many polymers, composites, and pure materials that can be made to conform or flow into a nano-mold, either by having adequate malleability at a practical temperature, or by forming a melt, a solution, or a fluid gel. In contrast, using a bottom-up nanofabrication technique, such as CVD, the range of practical materials that can readily form nanostructures when deposited or brought together on a substrate are much more limited.

In spite of the above-mentioned advantages of NIM for nanofabrication, the conventional nanoinjection process usually requires the application of a large hydraulic and/or axial pressure to force the injection of target material into the nano-mold. As expected, significantly higher pressures are needed for nano-molding as the smaller nanostructure are used, and/or the aspect ratio (width to depth or height ratio) is increased, and/or a higher viscosity material is used. More quantitatively, the required pressure ΔP, to move a viscus fluid with viscosity η, at a small velocity u, inside a circular capillary tube of diameter d, which is filled with the fluid to a length/depth of L, can be approximated in its simplest form as $\Delta P=32 \, nuL/d^2$. This formula indicates that the required pressure to move the fluid inside the tube, at a small velocity, increases linearly with both the filling velocity and the filled length. In other words, as the nano-tube is filled, progressively higher pressure is needed to maintain the flow rate. The above formula also indicates that the required pressure is proportional to the viscosity of the fluid, which for some fluids may be reduced for example by increasing the temperature or diluting the composition. However, higher temperatures may be incompatible with some materials and/or nano-molds. This equation also shows that the required pressure, which is inversely proportional to the diameter squared, increases super-linearly as the tube diameter, or equivalently the feature sizes of the nano-mold, are reduced in order to achieve nanostructures with smaller dimensions.

As an example of the above more general discussion, to fill a 100 nm-wide vertical hole with a viscus fluid (e.g., a molten ionic salt) with η~1 Pascal·sec to a depth of 1 mm, at an average rate of about 0.1 mm/s, the above formula shows that the applied pressure should be increased to several hundred atmospheres. Furthermore, depending on the properties of the viscus fluid and the nano-mold structure, forced NIM may require both very high pressures and high temperatures, which can be incompatible with many materials, cause defects or structural damage, and/or prove to be impractical for commercial production.

The present invention addresses the problem with the required high pressures in conventional nanoinjection process by allowing efficient and complete filling of a wide range of nano-mold geometries, including ordered and disordered structures with pore sizes from tens of micrometers to few nanometers, regardless of the depth of the pores to be filled, without the need to apply an external pressure. The present invention, which is a pressureless or zero-applied-pressure NIM (ZAP-NIM) method, is based on a novel application of electroosmosis (EO) effect to a nanoinjection process, which is suitable for a wide range of materials and nano-molds.

The novel application of EO in the present invention (ZAP-NIM) provides a very versatile, economical and scalable method to fabricate nanostructured materials and devices with a wide range of structures, geometries, and sizes, including high aspect-ratio, ultrasmall feature (e.g., nano-wires) down to a few nanometers in width and many micrometers in length. As an example of the ZAP-MIN applications, we also describe the process for the fabrication of a highly ordered, nanostructured x-ray scintillator for ultrahigh resolution x-ray imaging, with important applications in medical imaging, materials science, bioengineering, semiconductor manufacturing, astronomy, and high-energy physics.

DETAILED DESCRIPTION OF THE PREFERRED EMBODIMENTS

FIG. 1 shows the structure of an imaging apparatus, according to one example embodiment. An imaging apparatus or device 15 includes an anodized aluminum oxide (AAO) layer 10 that includes high-aspect-ratio microscopic open pores, herein referred to as nano-tubes, therein to form the segmented scintillator structure 25. In one embodiment, AAO nano-tubes are formed in an aluminum layer. The sidewalls of the nano-tubes are coated with a reflective material 26, and the nano-tubes are filled with scintillator materials 14. A photocathode structure 35 is positioned in close proximity and is optically coupled to the segmented scintillator structure 25. In one embodiment, the segmented scintillator structure 25 is uniformly segmented. In another embodiment, the segmented scintillator structure 25 is intentionally patterned. The segmented scintillator structure 25, in still another embodiment also includes a patterned matrix filled with a scintillator material 14. The scintillator material 14 is inside the patterned matrix. In still another embodiment, the segmented scintillator structure 25 is further comprised of plurality of aligned and ordered nano-tubes, filled with scintillator materials 14. At least some of the filled nano-tube form a waveguide to collimate and orient the photons 16 generated in the scintillator materials 14 toward the photocathode structure 35. The nano-tubes also can include a reflective coating 27 on top of the aligned and ordered nano-tubes.

The photocathode structure 35 includes one or more layers of high-efficiency semiconductor negative electron affinity (NEA) photocathode materials 18. In one embodiment, one or more layers of high-efficiency NEA photocathode materials 18 are employed in a semi-transparent mode, with a main energy bandgap tuned to the emission characteristics of the scintillator material 14 in order to minimize mean transverse energy (MTE) by reducing the energy and density of hot photoelectrons.

FIG. 1 also illustrates the basic operation of the invention, as well as the design and constituents of a preferred embodiment of the invention. It should be noted that the present invention is meant to be applicable for different incident high-energy radiation, including EUV, x-rays both hard and soft, gamma-rays, beta particle, alpha particles, energetic neutrons, and other ionizing radiation and particles. However, some details regarding the materials and structures used in the preferred embodiment of the invention will depend on the type of radiation to be detected. The characteristic of the incident radiation also determines the quantitative details of the preferred embodiment of the invention, such as different dimensions and arrangement of individual parts, as well as the type of scintillator and photocathode materials and of other components shown in FIG. 1. Hence, as an elucidating example of the preferred embodiments, the case of soft x-rays photons (1 to 10 KeV), with application of the invention in transmission x-ray microscopy, is described in details.

As shown in FIG. 1, x-ray radiation 12 enters the device 15 at near normal incidence. For example, the x-rays could be from a well-collimated and monochromatic x-ray source, after passing through a specimen positioned right above the device 15, and collectively forming a shadow image of the specimen for transmission x-ray microscopy, or from a distant x-ray source, such as a galactic center, collectively focused as an image on the device 15 using x-ray optics.

In the construction of the device 15, discussed in the following sections, the scintillator nano-columns are inserted or deposited in the well-oriented and uniformly sized and spaced nano-tubes that are formed in isotropic anodized aluminum oxide 10 (AAO). Depending on the details of the isotropic AAO fabrication process, the nano-tubes with a hexagonal or near circular cross section and a two-dimensional closed-packed surface arrangement are formed in an aluminum film. The nano-tubes can be as long as few hundred micrometers, can have pore diameter and wall thickness as small as few nanometers to several hundred nanometers, with a pore dimeter of 5 nm to 100 nm being the most useful range, as well as having a straight or tapered profile, all of which can be adjusted depending on the desired characteristics of the device 15. Though the most useful orientation of the nano-tubes is at normal to the plane of the photocathode layer, as illustrated in FIG. 1, a tilt angle of nano-tubes assembly 25 which is possible to create with some additional processing steps, may be useful for some applications, for example to prevent unabsorbed portion of incident x-rays from entering an attached electron-optics column, or for personal and equipment safety considerations. Prior to the insertion or deposition of the scintillator material 14 inside the nano-tubes, a very thin layer 26 of a material which is transparent to x-rays but very reflective for UV and/or visible light, such as 1 nm to 10 nm (~2 nm is preferred) film of high-purity aluminum, or silver, or platinum, etc., is deposited on the walls of the nano-tubes using a conformal thin-film deposition technique. A similar highly-reflective thin-film 27 is also deposited on top of the AAO surface, after filling the nano-tubes with the scintillator material 14. As shown in FIG. 1, an x-ray photon entering a scintillator nano-column 14 can produce a number of lower energy photons 16, depending on the x-ray photon energy and scintillator materials used, by interacting with the scintillator materials, such as $CeBr_3$, which has a photon yield of ~60 photons/keV emitted at a peak wavelength of about 380 nm. Most of the emitted photons 16, which are randomly oriented, are guided out of the scintillator column 14 into the photocathode layer 18, after multiple reflections from the reflective coating inside 26 and on top 27 of the nano-tubes.

The photocathode 18, in one of its simplest forms, can be a thin (~5 nm to 1000 nm, preferably ~50 nm) layer of p-doped indium-gallium-nitride (p-InGaN), with an indium mole fraction of up to 50% for a practical p-doped InGaN NEA photocathode, which is epitaxially deposited directly on the exit side of the AAO substrate, after depositing a thin optically-transparent nucleation/buffer layer 24. Incorporation of indium in GaN reduces the energy bandgap depending on the indium mole fraction, whereas alloying with aluminum (e.g., AlGaN) can be used to increase the energy bandgap. For example, in order to tune the energy bandgap of p-InGaN for the peak emission of the $CeBr_3$ scintillator at ~380 nm, the indium mole fraction should be about 5%, based on published experimental results on InGaN bandgap versus indium mole fraction. Tuning the energy bandgap of the NEA photocathode, particularly when the excitation photon energy is fixed, can be very important for reducing the mean transverse energy (MTE) of the emitted photoelectrons, which in turn is important for improving the imaging resolution of the microscope or detection system employing the present invention. Other approaches to reducing MTE include cooling the photocathode to cryogenic temperatures in order to reduce thermal energy, and/or reducing the surface roughness of the photocathode layer to improve surface electric field uniformity, and/or using photocathode structures that enhance thermalization of hot electrons (i.e., photoelectrons that are excited to energies significantly above the conduction band minimum), and/or inserting energy-filtering layers in the photocathode structure to reduce the energy spread of the emitted photoelectrons. It should be noted that the materials and structure of the present invention is compatible with applying all of the above techniques to minimize MTE. However, employing any of these additional features depends on both the photocathode characteristics and the details of the application, and hence, they are not included in the basic preferred embodiment of the present invention, as illustrated in FIG. 1. The more common additional component of the photocathode, shown in FIG. 1, is the NEA activation layer 28, which is usually a very thin cesium layer for GaN-based NEA photocathodes. FIG. 1 also shows an optional electron-transparent film 30, such as a graphene layer, to provide additional protection against surface oxidation, and/or rapid loss of Cs layer, and/or surface damage due to ion back-bombardment, and/or increase the uniformity of surface electric field for improved photoemission uniformity.

FIG. 2 is a flow diagram of the main steps of the inventive method for fabricating the preferred embodiment of the present invention. Each step in FIG. 2 refers to one of the FIGS. 3.A, 3.B, 3.C, and 3.D, illustrating the consecutive stages of the fabrication process. It should be noted that the materials and processes to be described are not to be constructed as limiting the invention, but an example of preferred materials and methods for constructing the preferred embodiment of the invention, as illustrated in FIG. 1. The fabrication process is started by depositing a thin layer of high-purity aluminum 42 on a standard conductive double-side polished silicon (111) or (100) substrate 40, as shown in FIG. 3A. The thickness of the aluminum layer 42 depends on the selected length of the AAO nano-tubes (<1000 nm). Standard recipes for silicon surface preparation, and vacuum deposition of high-quality epitaxial aluminum films are used in order to improve the quality of the AAO structure 10, shown in FIG. 3B. The anodization of the aluminum layer 42 is also done using published recipes to control the characteristics of the highly ordered nano-tubes 44, including pore diameter, spacing, uniformity, and if needed any tapering or tilting of the nano-tube walls. The aluminum layer can be anodized either completely, as shown in FIG. 3B, or partially by not converting a portion of the aluminum layer into AAO. Next, a thin layer (about 1 nm to 2 nm) of reflective aluminum (or silver, or some other highly reflective material) is deposited inside the nano-tubes 44 using a conformal thin-film deposition technique, preferably atomic layer deposition (ALD), using a standard thin-film deposition recipe.

The next step which is filling the nano-tubes 44 with the scintillator material 14, depends on the AAO nano-tube dimensions and the scintillator material. For example, the melting temperatures of CsI, NaI, and $CeBr_3$ scintillators are between ~630° C. to 730° C., which allow a hydraulic hot-press insertion process in vacuum. After filling the nano-tubes 44 with the scintillator material 14, a thin (1 nm to 100 nm) reflective aluminum film 27 is also deposited using standard thin-film deposition techniques. The resulting structure is illustrated in FIG. 3C after the removal of a portion of both the silicon substrate 40 and the scintillator-filled structure 25, to form an access hole 48 from the backside of the substrate. The access hole 48 provides an exit for the photons that are generated in the scintillator 14, and allow a direct deposition and/or attachment of the photocathode structure 35 at the exit surface. The process of forming the access hole 48 can be performed by a combination of mechanical and/or wet chemical etching and/or anisotropic dry chemical etching, such as reactive ion etching (RIE), using established semiconductor processing recipes The fabrication of the preferred embodiment of the present invention is completed by forming the photocathode structure 35 in the access hole 48, as illustrated in FIG. 3D. The photocathode layer 18 may be deposited directly on the etched face of the scintillator structure 25, by a number of deposition techniques, such as molecular mean epitaxy (MBE). However, the preferred process, illustrated in FIG. 3D, starts by forming a thin, optically transparent nucleation/buffer layer 24. This layer can be for example a very thin (~1 nm to 100 nm) aluminum-nitride (AlN) film deposited by RF-plasma-assisted MBE, or reactive magnetron sputtering or plasma-enhanced ALD. These thin-film deposition techniques allow formation of smooth c-place oriented AlN at moderate temperatures of <400° C., which is important to prevent melting of the scintillator materials and/or any significant interface reaction between the scintillator and deposited layers. Next, the photocathode layer 18, which is ~50 nm of magnesium-doped InGaN, with indium mole fraction of ~5% for matching the $CeBr_3$ emission, is epitaxially grown on the AlN layer 24 in an RF-plasma-assisted MBE chamber, which in addition to an RF-plasma nitrogen source, is at least equipped with calibrated effusion sources for depositing Ga, In, and magnesium (Mg, for p-doping). Finally, a very thin layer (about 1 monolayer) of cesium 28 is deposited in a separate vacuum chamber on the p-InGaN photocathode layer 18 in order to induce NEA at the surface. An optional electron-transparent top layer 30, such as single-layer graphene, may be also deposited or transferred onto the photocathode structure in order to improve the stability, lifetime, and/or photoemission emission characteristics.

There are a few other important details to consider, including the diameter of the access hole 48 in FIG. 3C, or in other words the size of the resulting scintillator-photocathode membrane, which in the case of transmission x-ray microscopy determines the maximum sample size for imaging. The main factor limiting the size of the membrane for this application is the mechanical tolerance of the completed device structure 15 for the total uniaxial pressure that results from the atmospheric pressure on the x-ray side, with the photocathode side in vacuum 22, plus the electrostatic force from the high acceleration fields of >40 KV in the electron optics column. Assuming that the AAO thickness is about 500 nm, based on the experimentally tested strength of AAO structures, this high uniaxial stress should not be a major problem for a membrane with diameter of less than a few millimeters, which can potentially be even larger when the nano-tubes 44 are filled with the scintillator materials 14. However, the practical size of the membrane should be determined experimentally based on the details of the device structure. It should be also noted that a limited deformation, or bowing, of the membrane under high uniaxial pressures is acceptable since relatively simple x-ray optics can be used to maintain the normal incidence of the incoming x-rays 12 with respect to the bowed plane of the structure 15, while also reversing the resulting small divergence of the emitted photoelectrons 20 can be accomplished using an electron beam condenser. The sample size restriction for transmission x-ray microscopy application may also be solved by using an x-ray transparent sample holder such as ultra-thin CNB membranes from Canatu Oy (Vantaa, Finland) in order to position or mechanically scan larger samples across the imaging area of the device 15. Alternatively, for applications requiring larger size membranes a mechanical support grid can be formed at the same time that the access hole 48 is etched into the substrate, and/or deposited later on top and/or bottom of the device. The openings in the mechanical support grid would allow simultaneous observation of a number of smaller regions of interest in the sample. This can be important for observing interaction and effects of spatially separated parts of a sample, which can be for example a complex micro-electromechanical system (MEMS) device or a multi-cell biological specimen. It should be also noted that for some applications such as x-ray detection/imagining in astronomy, or high-resolution position sensing detectors for high-energy-physics experiments, there is no such size restriction since for these applications normally both sides of the device 15 will be in vacuum, and also usually much lower acceleration electric fields are applied compared to applications that employ electron optics. Furthermore, the size, depth and shape of the access hole 48, including the bottom and sidewall profiles, as well as any built-in or field-induced bowing or otherwise shaping of the membrane, may be utilized for a number of other beneficial aspect of the present invention, such as shaping the electrostatic field at the surface and edges of the membrane for improved photoemission characteristics or focusing the photoelectrons, and/or creating a built-in strain in the membrane to oppose the stress caused by atmospheric and electrostatic forces, and/or other beneficial features to improve the performance, increase the utility, and/or lowering the production costs by simultaneously fabricating many small size membranes on large diameter substrates (e.g., 300 mm silicon substrate), etc.

Hence, the multi-purpose high-energy particle sensor array of the present invention, in its various possible embodiments, provides the flexibility to match the requirements in a number of important applications, while maintaining the main purpose and sprit of enabling previously unmatched imaging resolutions using high-energy particles in a practical device.

In summary, an imaging apparatus includes a segmented scintillator structure, and a photocathode structure optically coupled to the segmented scintillator structure. The imaging apparatus converts high-energy particles with an arbitrary spatial distribution to a corresponding distribution of photoelectrons, emitted with a very low spread in energy and momentum. In one embodiment, the segmented scintillator structure is uniformly segmented. In another embodiment, the segmented scintillator structure is intentionally patterned. The segmented scintillator structure, in still another embodiment also includes a patterned matrix filled with a scintillator material. The scintillator material is inside the patterned matrix. In still another embodiment, the segmented scintillator structure is further comprised of plurality of aligned and ordered nano-tubes, filled with scintillator materials. At least some of the filled nano-tube form a waveguide to collimate and orient the photons generated in the scintillator materials toward the photocathode structure. The nano-tubes also can include a reflective coating on the side walls and top of the aligned and ordered nano-tubes.

The photocathode structure includes one or more layers of high-efficiency semiconductor negative electron affinity (NEA) photocathode materials. In one embodiment, one or more layers of high-efficiency semiconductor NEA photocathode materials are employed in a semi-transparent mode, with a main energy bandgap tuned to the emission characteristics of the scintillator materials in order to minimize mean transverse energy (MTE) by reducing the energy and density of hot photoelectrons.

A method for fabrication an imaging apparatus includes depositing a layer of a first material on a substrate, forming nano-tubes in the first material, depositing a reflective material inside of the nano-tubes, inserting a scintillator material in the nano-tubes, removing a portion of the substrate to expose the nano-tubes filled with scintillator material, and depositing an NEA photocathode material onto the area with exposed nano-tubes filled with scintillator material. In one embodiment, cesium is deposited onto the photocathode layer to activate the NEA photocathode material. In still another embodiment, additional layer or layers may be deposited onto the activated NEA photocathode material.

The method can also include tuning one or more parameters of the photocathode structure to reduce the mean transverse energy (MTE) of the emitted photoelectrons in order to achieve an image resolution in the range of 50 nm to 1 nm. In another embodiment, tuning one or more parameters of the photocathode layer for reducing the MTE of the emitted photoelectrons includes at least one of:

the composition of the materials of the photocathode layer;

the surface morphology of the photocathode layer;

inserting electron thermalization structures in the photocathode layer;

inserting energy filtering structures in the photocathode layer;

cryogenic cooling of at least a portion of the photocathode layer; and applying electron-transparent surface coatings to the photocathode layer.

Also disclosed is a high-energy particle transfer microscope that comprises an electron optics column coupled to the imaging apparatus of the present invention. Further disclosed is a high-energy particle transfer microscope that also includes an electron charge intensifier in the electron optics column.

Additionally disclosed is a high-energy particle imager that comprises the imaging apparatus of the present invention, coupled to an electron charge intensifier array and a phosphor screen or a position-sensitive electric charge readout array, for high resolution imaging using ionizing radiation, including x-ray or gamma ray photons, or other high-energy particles.

Also disclosed is a position-sensitive high-energy particle detector that comprises the imaging apparatus of the present invention, coupled to an electron charge intensifier and a position-sensitive electric charge readout array, for high-efficiency detection of high-energy particles and photons with high spatial and temporal resolutions.

Figure 4:
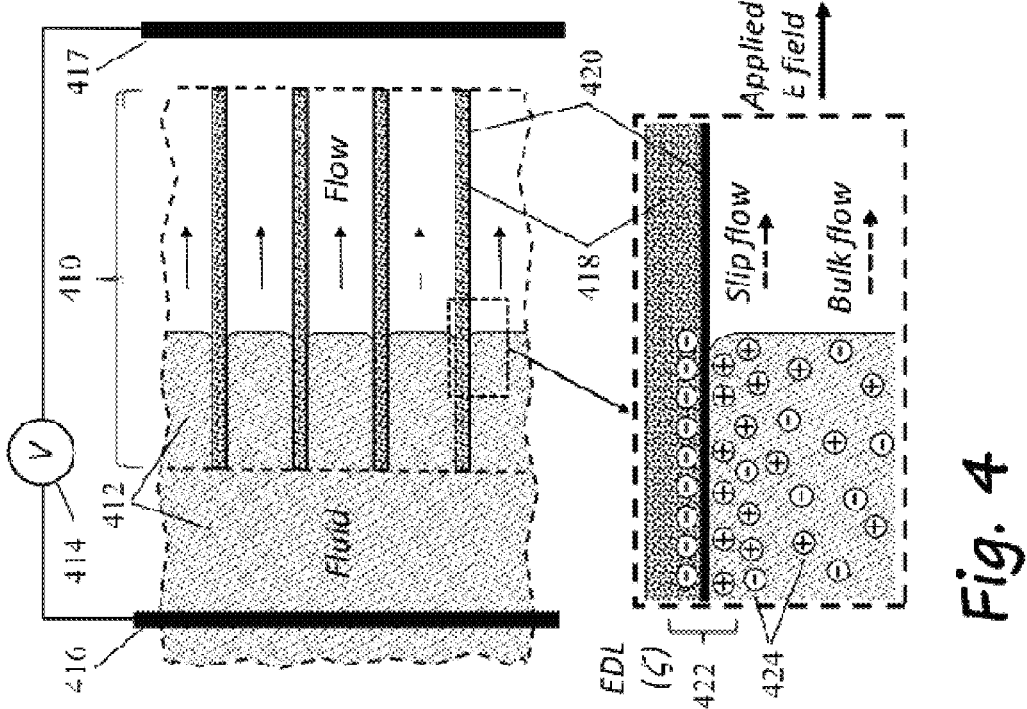
FIG. 4 shows the basic drawing of the present invention which employs electroosmosis (EO) to inject an ionic fluid into a nano-mold, without the need for an externally applied pressure. The enlarged section (inside the dashed square boarder) illustrates the EO process, where an electric charge double layer (EDL) is formed between the charged components of an ionic fluid and the non-conducting walls of the nanotubes, with a corresponding electric potential, $\zeta$. When a properly directed electric field, E, is applied to the ionic fluid by connecting the conductive electrodes to a voltage source, V, a slip flow layer is generated close to the fixed ion layer due to local abundance of one of the ionic species compared to the oppositely charged component in the fluid. The slip layer then drags along the rest of the fluid, resulting in a bulk flow to fill the nano-mold. Prior to complete filling of the nanotubes, the electrical circuit for charge transfer is completed by an electrically conductive layer on the walls of the nano-tubes and/or a conductive gas or vapor inside the nano-tubes.

FIG. 4 shows a cross-sectional view of the novel zero-applied-pressure nanoinjection molding (ZAP-NIM) process which employs electroosmosis (EO) effect to inject an ionic fluid 412, without application of an external pressure, into a nanostructured mold 410 with an electrically non-conductive surface, such as a class capillary array (GCA), or an isotropic anodic aluminum oxide (AAO) array. However, the ZAP-NIM method is not limited to ordered nano-molds and can be also applied to disordered porous material with connected pores, such as a 3D silica opal and others. If due to differences in electron affinity, or some surface reactions, static charges are accumulated on the non-conducting tube wall 418, then ions with opposite charge in the fluid are collected as a static layer. The formation of the electric double layer (EDL) 422 at the tube wall 418, with the corresponding electric potential, $\zeta$, is illustrated in the lower inset of FIG. 4. The ions 424 in the fluid, which are a bit further away from the wall 418, will be mobile and can slip on the static layer under the influence of an electric field, applied by the conductive electrodes 416 and 417, due to a higher density of one of the ionic components compared to the other. The resulting slip or sheer layer moving along the inner wall of the nanotube drags along the fluid in the central region of the tube, resulting in bulk fluid flow, i.e., pumping of the fluid in the narrow, long tube without applying an external pressure.

The above explanation generally describes an EO pumping process. Since the EO pumping require continuous flow of charges from the voltage source, completing the electrical circuit in the EO setups, schematically illustrated in FIG. 4, requires that both electrodes to be in direct contact with the fluid and/or separated by a membrane that is permeable to ions. In other words, the ionic liquid 412 should be in contact with the conductive electrodes 416 and 417 on both sides of the nano-mold 410. In most EO pumping applications, this condition is normally achieved by initially filling the capillary tubes with the ionic fluid which is usually done by forced injection of the fluid into the capillary tubes, i.e., pressure-assisted filling. In other words, the EO pumps need to be "primed" before they can function. The required pre-filling of the capillary tubes or porous media would of course defeat the main purpose of the current invention, ZAP-NIM, which is to start with an empty nano-mold and fill it with a desired fluid without the need for applying an external pressure.

As illustrated in FIG. 1, the present invention allows pressureless filling of capillary tubes and nano-molds using EO effect by employing a novel electrically conductive medium 420 inside the nanotubes 410 to complete the electrical circuit and allow zero-pressure filling of the nanotubes 410 with the ionic fluid 412. As a result, there is no need for the fluid 412 to be in direct contact with both conductive electrodes 416 and 417. The electrically conductive medium 420 may be formed on the inside wall of the capillary tubes 10 and/or be added to the unfilled space inside the capillary tubes. This innovative method clearly distinguishes the present invention for pressureless nano-mold filling using EO effect (ZIP-NIM) from other EO pumping of fluids through pre-filled (primed) capillary tubes and other porous media.

In a basic embodiment of the present invention, illustrated in FIG. 4, a nanostructured mold 10, such as a GCA or an AAO sample, is placed with one side in contact with an ionic and/or electrolytic, and/or an ionic suspension or sol-gel, and/or some other ion-containing fluid 412, which is in electrical contact with an electrode 416 attached to one of the contacts of a voltage source 414. A second electrode 417, connected to the second contact of the voltage source 414, is in contact with or in close proximity of the other side of the nano-mold. In order to complete the electrical circuit, prior to putting the nano-mold in contact with the fluid 412 or the electrodes 416 and 417, the electrical resistivity along the length of the nano-tubes is reduced by depositing a very thin conductive coating inside the nano-tubes using conformal thin film deposition, such as atomic layer deposition (ALD). The resistivity of the walls of the nanotubes may be also reduced by modifying the chemical properties of the nanotube wall using different processing steps, such as thermal annealing, and/or chemical exposure, and/or exposure to a plasma, and/or different radiations, force fields, and the like. A separate electrically conductive layer, such as a metallic film, can be also deposited on one or both sides of the nano-mold 410, without blocking the nanotubes, in order improve the uniformity of the electric potential applied to the nano-tubes. Finally, depending on the specifics of the ionic fluid 412 and the nano-mold 410, the direction and the strength of the applied voltage 414 is adjusted to achieve a moderate flow rate in order to avoid turbulent flow and potential bubble formation.

In another embodiment of the present invention, the electrical circuit for EO nanoinjection may be completed by increasing the electrical conductivity of the unfilled portion of the nano-tubes 410, i.e., the empty space between the fluid 412 and the second electrode 417, using an electrically conductive gas, vapor, and/or plasma. As an example, the vapor from an ionic salt, such as CsI or NaI scintillators, heated to above the sublimation temperature (e.g., ~550° C.

to 650° C.), or mercury vapors, or a low-pressure argon plasma, or the like, may be also used to reduce the resistivity of the tube wall. Additionally, the condensation of these vapor on nano-tube walls may also reduce resistivity and/or enhance surface wetting.

In yet another embodiment of the present invention, in the case of ionic materials which are solid at normal temperatures, the nano-mold and the ionic material may be heated up separately or together to above the melting temperature of the ionic material, as long as the required temperature is not above the acceptable range for the nano-mold. For example, borosilicate GCA is limited to ~650° C., whereas AAO can be heated to at least 1000° C. In comparison the melting temperature of the ionic compound CsI is about 620° C., and that of NaI is about 660° C.

In another embodiment of the present invention, a combination of DC, AC, and/or pulsed voltage, with a magnitude as high as needed and practical, may be applied to the electrodes 416 and 417 to precisely control different components of the fluid flow in the capillary tubes 10 in order to ensure a complete and low defect nanoinjection process. Furthermore, one or both of the conductive electrodes 416 and 417 can be in direct contact with the fluid 412, during or at some of the stages of the nanoinjection process.

In yet another embodiment of the present invention, depending on the specifics of the ionic material and/or nano-mold, some other arrangements of the ZAP-NIM setup described above may be employed. For example, the conductive electrodes 416 and 417 may be formed by depositing a suitable metallic film on one or both sides of the nano-structured mold 410 using different thin-film deposition techniques. This can have one or more of several advantages. The possible advantages include but are not limited to (1) more uniform electric field applied to the nanotubes, (2) the possibility of measuring the electrical resistance between the top and bottom metallic layers to detect the completion of the nanoinjection process, with the ionic fluid providing a low-resistance electrical path between the two metallic layers, and 3) improving the efficiency and uniformity of indirect or radiative heating of the nano-mold 410. The latter advantage, can be important for different purposes, including 1) thermal outgassing and/or vacuum backing of the nano-mold, 2) modifying the nano-mold properties and characteristics, e.g., changing the nano-tube resistivity, by annealing and/or heat treatment, or by chemical processes that require higher temperatures, and 3) filling the nano-mold with high-temperature ionic fluids, such as molten CsI or NaI, which requires the nano-mold to be kept above the melting temperature of the ionic compound during the nanoinjection process.

In a further embodiment of the present invention, the nano-mold can be modified by depositing a layer on the inside walls of the pores using a conformal deposition technique such as ALD and/or by high pressure and/or high temperature deposition, condensation, reduction, and/or etching processes, in order to enhance the formation of the EDL layer, or change other properties of the mold matrix, such as the index of refraction, electrical conductivity, defect density, and/or surface wetting properties. For example, by depositing a thin metallic layer (e.g., aluminum or silver) followed by a thin insulating layer such a $SiO_2$ inside the pores of the nano-mold, it may be possible to apply a separate voltage to the thin metallic layer to set up an electric field normal to the capillary wall in order to induce a strong EDL layer even for filling materials that are weakly ionic. This could expand the application of the present invention to a wider range of materials and nanostructured molds.

In yet a further embodiment of the present invention, a separate or a combination of applied energies or fields, including but not limited to additional electric and/or magnetic fields, and/or exposure to different radiation, including but not limited to microwaves and/or light with wavelength from far IR to deep UV, and or energetic ions, and the like, may be used to modify the properties of the nano-mold and/or the fluid before and/or during and/or after the filling process.

The author of this article has previously disclosed the integration of nanostructured Scintillators with high performance semiconductor photocathodes in US Published Patent Application 2022/0082713 A1, entitled "A MULTI-PURPOSE HIGH-ENERGY PARTICLE SENSOR ARRAY AND METHOD OF MAKING THE SAME FOR HIGH-RESOLUTION IMAGING", with important medical, scientific and industrial applications, including ultrahigh resolution transmission electron microscopy (TXM).

In another embodiment of the present invention, the ZAP-NIM method can be used to enable a low-cost fabrication of highly ordered nanostructured x-ray scintillators for high-resolution x-ray imaging and other related applications. In this embodiment of the present invention, a nano-structure mold consisting of a highly ordered and oriented array of closely packed capillaries, such as borosilicate GCA, isotropic AAO, or other synthesized or naturally formed nanostructures with similarly ordered pores, can be used. If the nano-pores are open at both ends, the remaining process can be done in vacuum or under an inert gas atmosphere, however with blind nano-pores, i.e., only open at one end, maintaining a vacuum can help with complete filling of the cavities without the formation of gas bubbles. Henceforth, the end of capillary tubes, where nanoinjection is started is referred to as the "top" of the nano-mold and the opposite side as the "bottom". Next, a thin film of a high temperature conductive material, such as Ni, Ti, Pt, Au, and the like, or combinations of any of these, or their alloys with other materials, or some other conductive high-temperature compound, is deposited on the bottom of the nano-mold. Optionally, a similar conductive film can be also deposited on the top side. The nano-mold is then placed or mounted on a holder that allows application of a voltage to one or both deposited metallic films. At this point, the nano-mold can be optionally baked in a vacuum to remove surface contaminants. Next, an ionic compound x-ray or gamma-ray scintillator material, with a relatively low melting temperature (<1000 C), such as pure or doped CsI, NaI, $Cs_4Pb_{I6}$, or others, or any combination of such scintillators, is brought into contact with the top of the nano-mold. The scintillator materials that are solid in normal temperatures can be first melted in a suitable crucible before bringing into contact with the nano-mold which is also heated to the same temperature or slightly above it. Alternatively, pieces of the solid scintillator can be placed on top of the nano-mold and then both are heated to above the melting temperature of the scintillator material. Finally, a voltage is applied to the metallic layers to establish an electric current and an electric field with a component parallel to the axis of the capillaries. As noted, the magnitude and direction of the electric field, or the application of DC, AC, and/or pulsed voltages, or combinations of these, plus other variations can be determined and possibly optimized based on the specifics of the scintillator material and nano-mold. The filling of the capillary tubes can be monitored during the nanoinjection process by measuring the electric current magnitude, and/or by other means such as optical transmittance, vibrational resonance, and/or other properties of the nano-mold and/or the scintillator material which would be affected by the percentage of the filling of the capillary tubes.

Figure 5:
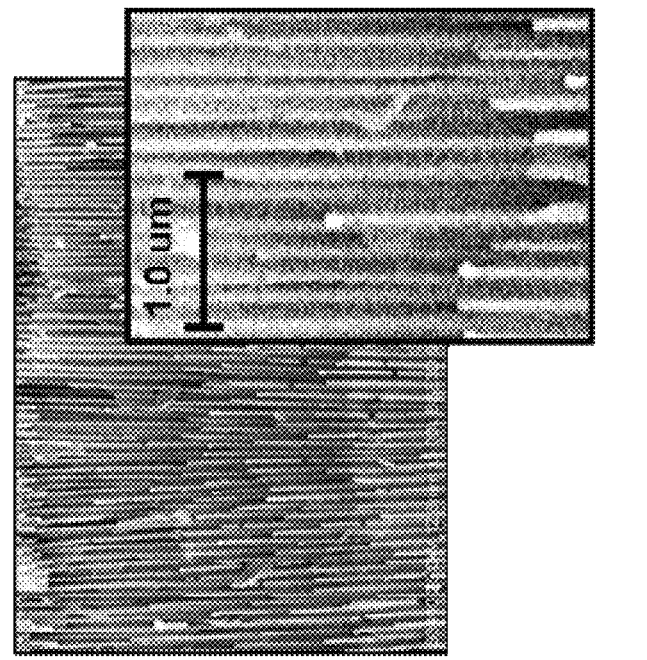
FIG. 5 shows the cross-section scanning electron microscope (SEM) images of a cleaved portion of an anodized aluminum-oxide (AAO) sample that was injected with molten CsI as an example embodiment of forming nano-structured materials using the nanoinjection molding process of this invention.

FIG. 5 shows an example embodiment of nano-structured CsI scintillator prepared using the ZAP-NIM process disclosed here. The images shown in FIG. 5 were obtained by cross-section scanning electron microscope (SEM) using a cleaved portion of an isotropic AAO sample that was injected with molten CsI. As shown, the narrow AAO channels are completely filled with CsI columns of less than 150 nm in diameter (the vertical lines in the figure, which are better distinguished in the zoomed SEM image). The CSI columns complexly fill the 200 nm long AAO channels. The CsI columns that seem to be terminated within the AAO sample result from breaking of the fragile CsI columns during the cleaving of the sample for cross-section SEM imaging.

While the foregoing written description of the current invention enables one of ordinary skill to make and use, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

The invention claimed is:

1. A method for pressureless filling of nano-molds using electroosmosis comprising:

providing a nano-mold including an electrically conductive medium, first side having an opening, and a second side, wherein the opening has a diameter of between 1 nm and 1000 nm;

contacting an ionic fluid with the opening; and applying a voltage between the first side to the second side to allow the ionic fluid to fill the nano-mold without using pressure, via electroosmosis wherein, prior to contacting the ionic fluid with the opening, the nano-mold is substantially empty of liquid.

2. The method of claim 1, wherein the nano-mold comprises one or more nanotubes.

3. The method of claim 1, wherein the nano-mold comprises one or more capillary tubes.

4. The method of claim 1, wherein the nano-mold is made from a porous material.

5. The method of claim 1, wherein the electrically conductive medium is made of an intrinsically electrically conductive material.

6. The method of claim 1, further comprising a first electrode in electrical contact with the first side and a second electrode in electrical contact to the second side.

7. The method of claim 1, wherein voltage is one or more of a constant voltage, a variable voltage, and a pulsed voltage.

8. The method of claim 1, wherein the ionic fluid comprises is one or more of a solution, a suspension, a sol-gel, a chemical in molten form, a compound, and a mixture.

9. The method of claim 1, further comprising chemically altering, disintegrating or dissolving the nano-mold concurrent to injecting.

10. The method of claim 1, further comprising physically altering, disintegrating or dissolving the nano-mold concurrent to injecting.

11. The method of claim 1, further comprising chemically altering, disintegrating or dissolving the nano-mold after injecting.

12. The method of claim 1, further comprising physically altering, disintegrating or dissolving the nano-mold after injecting.

13. The method of claim 1, wherein the conductivity of the electrically conductive medium is modified by chemically processing the electrically conductive medium.

14. The method of claim 1, wherein the conductivity of the electrically conductive medium is modified by heating the electrically conductive medium.

15. The method of claim 1, wherein the conductivity of the electrically conductive medium is modified by depositing a thin conductive layer on the nano-mold.

16. The method of claim 1, wherein the electrically conductive medium comprises a conductive gas, plasma, or vapor.

17. The method of claim 1, wherein the conductivity of the electrically conductive medium is modified by applying an electric field to the electrically conductive medium.

18. The method of claim 1, wherein the conductivity of the electrically conductive medium is modified by exposing the electrically conductive medium to radiation.

19. The method of claim 1, wherein the conductivity of the electrically conductive medium is modified by inserting a conductive gas, plasma, or vapor into the opening.

20. The method of claim 1, wherein the electrically conductive medium comprises a conductive material lining an interior of the nano-mold.

* * * * *